United States Patent [19]

Smith

[11] 4,239,870

[45] Dec. 16, 1980

[54] PROCESS FOR COUNTERING EFFECTS OF FAST POISONS IN CONTINUOUS OLEFIN POLYMERIZATION

[75] Inventor: Richard L. Smith, Bartlesville, Okla.

[73] Assignee: Phillips Petroleum Company, Bartlesville, Okla.

[21] Appl. No.: 58,587

[22] Filed: Jul. 18, 1979

[51] Int. Cl.$^3$ .............................. C08F 2/06; C08F 2/14
[52] U.S. Cl. ........................................ 526/59; 526/60; 526/61; 526/77
[58] Field of Search ........................ 526/59, 60, 61, 77

[56] References Cited

U.S. PATENT DOCUMENTS

| | | | |
|---|---|---|---|
| 3,091,653 | 5/1963 | Nogradi | 526/77 |
| 3,276,843 | 10/1966 | Cooper | 23/230 |
| 3,290,116 | 12/1966 | Carroll | 23/230 |
| 3,335,120 | 8/1967 | Hagemeyer et al. | 526/70 |
| 3,488,339 | 1/1970 | Carter | 526/77 |
| 3,523,110 | 8/1970 | Eichenbaum | 526/77 |
| 3,725,377 | 4/1973 | Cottle | 260/942 R |
| 3,755,273 | 8/1973 | Uraneck et al. | 260/83.7 |
| 3,819,510 | 6/1974 | Albertins | 208/290 |

*Primary Examiner*—Stanford M. Levin

[57] ABSTRACT

In a continuous process for producing olefin polymers by contacting olefin monomers with an initiator or catalyst in a polymerization zone, the improvement comprising contacting fast poisons in the feed with a scavenging agent in a scavenging zone under conditions such that no significant amount of polymerization occurs until said feed is contacted with the initiator or catalyst in a polymerization zone.

38 Claims, No Drawings

PROCESS FOR COUNTERING EFFECTS OF FAST POISONS IN CONTINUOUS OLEFIN POLYMERIZATION

This invention relates to olefin polymerization. More specifically this invention relates to a method of countering the effects of fast poisons, materials which tend to deactivate or poison the polymerization catalysts or initiators.

Catalyst or initiator poisons are a persistent problem in olefin polymerizations. Failure to adjust for these poisons typically causes variations in the polymer which is produced, and in the reactor operation, particularly as related to reactor fouling due to gel formation in continuous polymerization systems. Continuous polymerization processes can even become inoperable when high levels or a wide variation in level of fast poisons is encountered.

Although great care is routinely taken in polymerization processes to pretreat the feed streams and polymerization reactor means to remove moisture, air, and other impurities which react readily with living polymer and polymerization initiator or catalyst, this is seldom quantitatively effective and inevitably some poisons occasionally enter the system.

In batch polymerization processes, one technique that has been used in the past to counter the effect of fast poisons has been to employ additional initiator to make up for the amount that would be inactivated by the fast poisons.

In the batch process, the reaction between initiator and fast poisons is essentially complete before polymerization has progressed more than a few percent.

In continuous polymerization processes wherein at least one polymerizable olefin monomer stream and at least one polymerization initiator are continuously brought into contact in a polymerization zone while produced olefin polymer is removed from the reaction zone, the addition of excess initiator in the polymerization zone is not a satisfactory method for inactivating the fast poisons. The use of excess initiator in the polymerization zone results in products of reduced molecular weight. This is believed to be due to the fact that in the continuous system the poisons in the feed are exposed to live polymer that is not present during the initial phases of a batch polymerization system. Thus in the continuous system much of the poison probably reacts with the live polymer rather than initiator. The excess initiator then has the effect of reducing the molecular weight of the polymer since the molecular weight of the polymer is inversely related to the amount of initiator employed.

Accordingly, an object of the present invention is to provide a process for reducing the amount of fast poisons in a continuous polymerization without adversely affecting the molecular weight of the product.

Another object of the present invention is to provide an improved process for reducing the fouling of the polymerization reactor employed in a continuous polymerization process.

Other aspects, objects, and advantages of the present invention will be apparent from the disclosure which follows.

In accordance with the instant invention, the amount of fast poisons in the feed that is passed to the polymerization zone in a process for the continuous polymerization of a polymerizable olefin is reduced by continuously contacting at least a portion of the feed that contains fast poison with at least one suitable scavenging agent in a scavenging zone under conditions such that no significant amount of polymerization occurs until said feed is contacted with catalyst or initiator in said polymerization zone.

Typical of the fast poisons to which this invention is directed are carbon dioxide, oxygen, water, alkenes, acetylenes, carbonyl containing compounds, alcohols, thiols, and the like. Generally such poisons are denoted as fast poisons because their reactivity is such that they generally inactivate initiator or catalyst before the initiator or catalyst can react with monomer.

The scavenging agent can be a material which can initiate polymerization of olefin monomers or it can be a material which does not initiate polymerization of olefin monomers. When the scavenging agent is a substance that can initiate polymerization, it must be used at a level which will assure that no significant polymerization occurs until the monomers are contacted with the polymerization initiator in the polymerization zone. Preferably, when the scavenging agent is also an initiator the maximum amount employed is that amount necessary to inactivate substantially all of the fast poisons.

Among the scavenging agents which can be used are the alkali metals, and the organoalkali metal compounds of the general structure $R(M)_x$, where R contains from 1 to about 20 carbon atoms and is a hydrocarbon radical selected from the group consisting of aliphatic, cycloaliphatic, and aromatic radicals, M is an alkali metal, and x is an integer from 1 to 4 inclusive. Organolithium compounds are a presently preferred scavenging agent. Examples of organolithium compounds which can be used include: methyllithium, isopropyllithium, n-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,2-dilithio-1,2-diphenylethane, 1,2-dilithio-1,8-diphenyloctane, 1,3,5-trilithiopentane, 1,5,15-trilithioeicosane, 1,2,5-trilithiocyclohexane, 1,3,5,8-tetralithiodecane, 1,5,10,20-tetralithioeicosane, 1,2,4,6-tetralithiocyclohexane, 4,4′-dilithiobiphenyl, and the like.

In addition suitable scavenging agents include the alphalithio multisubstituted dialkylbenzenes and corresponding oligomers which can be prepared by the reaction of an organomonolithium compound, of the type listed above, with a multivinylaromatic compound such as the di- and trivinylbenzenes and -naphthalenes. Divinylaromatic hydrocarbons containing up to 18 carbon atoms per molecule are preferred, particularly divinylbenzene as either the ortho, meta or para isomer, and commercial divinylbenzene, which is a mixture of isomers, also is quite satisfactory. These multifunctional organolithium compounds are usually used as a mixture in a suitable solvent.

Other suitable scavenging agents are catalysts such as are disclosed in U.S. Pat. No. 2,825,721 to John P. Hogan and Robert L. Banks, and the Ziegler type catalysts.

Suitable non-initiating scavenging agents include any chemical composition which reacts with the fast poisons and is thereby deactivated so that it will not interfere with the polymerization reaction. Such chemical compositions include aluminum alkyls, zinc alkyls, boron alkyls, and the like.

For optimum results it is preferred that the scavenging agent be used in an amount which inactivates substantially all of the catalyst poisons. The level of scavenging agent necessary to achieve that end can be determined by any method known to those skilled in the art and will obviously vary with the particular type and source of feed employed and the type of scavenger agent which is used.

One method which can be employed when the scavenging agent can be a polymerization initiator involves the observation of a temperature rise of the ingredients-scavenging agent mixture. When the fast poisons are completely reacted, the monomers will begin to polymerize. This initiation of polymerization yields a temperature increase which is sensed by measuring the temperature of the effluent from the scavenging reactor means and the temperature of the feed to the scavenging reactor means.

Other methods suitable for determining the amount of an organoalkali metal scavenging agent needed to inactivate essentially all the fast poisons in the feed streams include the following techniques.

(1) A non-solvent for the polymer being produced is added to a small sample of the scavenging reactor means effluent until the mixture is about ≧50 volume percent non-solvent. If the mixture becomes cloudy on addition of the non-solvent, this indicates excessive scavenging agent has been used and that polymerization has been initiated. In practicing this method, normally the level of scavenging agent which is added is slowly increased until excess is shown by this procedure, and then the level is reduced until no precipitated polymer is detected.

(2) A measured sample of feed stream effluent from the scavenging reactor is treated with sufficient benzyl chloride to react with any excess organoalkali metal scavenger agent that may be present and the resulting mixture titrated with dilute hydrochloric acid to determine the amount of organoalkali metal which has reacted with the fast poisons. Adjustments in the amount of scavenging agent which is added to the scavenging reactor means can then be made on the basis of this titration value. This method is suitable when the fast poisons comprise compounds which react with organoalkali metal to yield a —X—M group wherein X is oxygen or sulfur, and M is an alkali metal.

(3) A small amount of iodine is added to a known amount of the feed stream leading to the scavenging reactor means, and this mixture titrated with organoalkali metal until the color due to the elemental iodine vanishes due to its reaction with excess organoalkali metal after fast poison inactivation has occurred. The disappearance of elemental iodine can also be detected by the phenomenon of electrical polarization of platinum electrodes in the presence of an electrolyte such as ammonium iodide in a polar solvent such as methanol. This level of organoalkali metal then represents the amount of scavenging agent which is required.

(4) A known amount of organoalkali metal is added to the feed stream leading to the scavenging reactor means, the amount of organoalkali metal being slightly in excess of the amount required to scavenge the fast poisons. A known amount of iodine is added which is sufficient to react with the excess organoalkali metal and which provides a small amount of excess iodine which excess can be measured by sensing the electrical conductivity of the solution.

In actual commercial operation, once a recipe has been developed which will give the desired product molecular weight and conversion in the absence of initiator poisons, one can just adjust the amount of the scavenger agent in response to how the conversion and the product molecular weight compare to that desired.

The scavenging reactor zone which is suitable for use in the process of this invention consists of one or more reactor means suitable for contacting the scavenging agent with a portion of the feed containing fast poisons. Typically, the monomers, diluent, gel inhibitor if employed, randomizing agent if employed, and any other polymerization mixture ingredient will all be contacted with the scavenging agent in the scavenging reactor zone. However, if desired, certain of these components could be charged directly into the polymerization zone, particularly if they are substantially free of fast poisons.

The scavenging reactor means can be of any configuration which provides for intimate contact between feed stream components and the scavenging agent. The scavenging reactor means may, for example, consist of one or more stirred reactors, one or more tube reactors, including such as Kenics static mixers, or combinations of these. The individual ingredients to be scavenged may be introduced to the scavenging reactor means from separate lines, or from a common line. The scavenging agent can be added as a pure compound, or preferably as a solution or suspension in an inert diluent, to the ingredients to be scavenged in the scavenging reactor means. The ingredients to be scavenged can be heated prior to introduction into the scavenging reactor means, or the scavenging reactor means may itself be heated, or both of these, or alternatively the ingredients and the scavenging reactor means can be at ambient temperature, the upper temperature being limited by practical factors such as vapor pressures, boiling points, and reactivity of ingredients and scavenger, optimum polymerization temperature, and equipment design and limitations. The time of contact between the scavenging agent and the ingredients to be scavenged can range from a few seconds to several hours, preferably from a few minutes to one hour. The ingredients may be fed continuously to the scavenging reactor means, or they may be scavenged in batch fashion, although for practical purposes, the continuous process is preferred.

The scavenging reactor means can be located in the polymerization reactor train just ahead of the polymerization reactor means, the scavenged ingredients being led directly from the scavenging reactor means to the polymerization reactor means. The polymerization initiator or catalyst is introduced into the polymerization reactor means by a separate line.

Any suitable polymerization reactor means or configuration can be employed in this invention. Non-limiting examples of suitable continuous polymerization reactor means include such as: (1) one or more stirred reactors connected in series, (2) one or more tube reactors, including loop reactors, connected in series, or (3) one or more stirred reactors connected in series connected further in series with one or more tube reactors which are connected in series. The reactor train can further comprise additional reactor means if desired, such as, for example, a reactor means for conducting polymerization termination, and a reactor means for flashing of diluent.

The invention is considered applicable to the solution or slurry polymerization of olefins containing 2 to 12 carbon atoms per molecule, preferably 2 to 8 carbon atoms per molecule, and especially conjugated dienes such as 1,3-butadiene, isoprene, 2,3-dimethylbutadiene, 2-methoxy-1,3-hexadiene, 1,3-octadiene and the like. As suitable conjugated diene feedstocks, mixtures of 1,3-butadiene, or other suitable conjugated dienes, in admixture with other low molecular weight hydrocarbons can be employed. Such admixtures, termed low concentration diene streams, are obtainable from a variety of refinery product streams such as naphtha-cracking operations or can be intentionally blended compositions, available from product streams produced in the modern complex oil refining and petrochemical facilities. Low concentration diene streams may contain such as from less than 30 to more than 50 weight percent of 1,3-butadiene, though the concentration can range widely. Examples of typical low molecular weight hydrocarbons which may be admixed with 1,3-butadiene in the polymerization feedstock include such as propane, propylene, iso- and n-butane, 1-butene, isobutylene, trans-2-butene, cis-2-butene, vinylacetylene, cyclohexene, and the like. The conjugated dienes can be polymerized either alone or in admixture with each other and/or with one or more compounds containing as active vinylidene group, which are copolymerizable with the conjugated dienes. Such comonomers representatively include such as vinyl-substituted aromatic compounds, such as styrene, α-methylstyrene, 3-methylstyrene, 4-cyclohexylstyrene, 1-vinylnaphthalene, and the like; homologues of acrylic acid esters, such as methyl acrylate, ethyl acrylate, methyl methacrylate, ethyl ethacrylate, methyl propacrylate, n-butyl acrylate, phenyl methacrylate, and the like; precursors of unsaturated carboxylic acids including nitriles and amides, such as acrylonitrile, methacrylonitrile, methacrylamide, and the like; ethers such as methyl vinyl ether; ketones such as methyl isopropenyl ketone, methyl vinyl ketone, and the like.

The polymerization initiators and catalysts suitable for this invention include those scavenging agents described hereinbefore which can be polymerization initiators for the monomers being employed. When conjugated dienes are being polymerized, presently preferred are the organolithium compounds. Suitable organolithium initiators include those mono-, di-, tri-, tetra-, and multifunctional organolithium compounds described previously as scavenging agents, as well as any other organolithium compound suitable as a polymerization initiator of conjugated dienes as taught in the art.

The amount of organolithium initiator to be used depends upon the desired molecular weight of the polymer being produced and is normally in the range of about 0.1 to 100 milliequivalents of lithium per 100 grams of total monomers, more preferably from 0.2 to 5 milliequivalents of active lithium per 100 grams of monomers.

Other catalyst systems which can be used in polymerizing the conjugated dienes are those which contain as an essential ingredient a compound selected from the group consisting of metals, organometals and metal hydrides, the metal being of Groups I, II or III of the periodic table. For example, hydrides or organo compounds of aluminum, gallium, indium, thallium, and beryllium can be used, alone or together with a di-, tri-, or tetrahalide of a Group IV metal such as titanium, zirconium, thorium, silicon, tin, lead, hafnium, germanium, or cerium. Mixtures of titanium tetraiodide (or titanium tetrachloride) and triethylaluminum, a mixture of titanium tetrachloride (or tetraiodide) and triisopropylaluminum, and a mixture of zirconium tetrachloride (or tetraiodide) and triethylaluminum can be used. A third component can be added to these mixtures if desired, such as iodine, or ethylaluminum dichloride or diethylaluminum chloride.

Gel inhibitors suitable for this process when an organoalkalimetal initiator is being usd include such as alkyl halides, silicon halides, monoolefins, and 1,2-butadiene. The level of gel inhibitor which is added varies widely, depending on the effectiveness of the specific compound chosen. 1,2-Butadiene is the presently preferred gel inhibitor, being added within the broad range of 0.01 to 0.3, more preferably from 0.02 to 0.1 parts per hundred parts of monomers.

Randomizing agents can be employed in the organolithium initiated polymerization of mixtures of conjugated dienes and monovinylarenes to substantially avoid the formation of substantial block content. Any suitable polar organic compound known in the art for randomization can be employed for such purposes, including hydrocarbyl ethers, thioethers, amines, organic and inorganic potassium, sodium, cesium, or rubidium compounds. Presently preferred is tetrahydrofuran.

The polymerization processes are usually carried out in the presence of a hydrocarbon diluent selected from the group consisting of aromatic, paraffinic and cycloparaffinic hydrocarbons. The preferred hydrocarbons of these types are paraffins and cycloparaffins containing from 3 to 12, inclusive, carbon atoms per molecule. Examples of suitable diluents include propane, isobutane, n-pentane, n-hexane, isooctane, n-dodecane, cyclopentane, cyclohexane, methylcyclohexane, benzene, toluene, xylene, ethylbenzene, and the like. It is to be understood that mixtures of two or more of these hydrocarbon diluents can also be used. The amount of diluent employed in the process is usually in the range of 200 to 2000 parts by weight per 100 parts by weight of total monomers with 300 to 1500 parts being a preferred range.

Solvents suitable for removing hydrocarbon insoluble, residual alkali metal compounds which form in the scavenging reactor means as a result of the reaction between organoalkali metal scavenging agent and fast poisons can be removed by contacting said residue with a polar organic compound. Examples include compounds such as ketones, aldehydes, ethers, and esters and mixtures. Presently preferred is acetone or tetrahydrofuran.

The cleaning solvent can be employed at a temperature and for a time which varies widely and is dependent primarily only on the rate desired for loosening, dissolving, and/or removal of the deposited residue. Generally, the cleaning solvent temperature can vary from room temperature substantially to the boiling point of the cleaning solvent, and can be used for from several minutes to several hours.

Two or more scavenger reactor means in a parallel configuration will allow the cleaning of one scavenger reactor means while the continuous process continues using parallel connected scavenger reactor means. If a parallel system is not employed for a continuous process, when cleaning of the scavenger reactor means is desired or required, the entire polymerization system may have to be shut down to facilitate such cleaning.

EXAMPLE I

A series of 75/25 butadiene/styrene random copolymers was prepared by continuous polymerization according to conditions specified in Recipe I.

RECIPE I

Cyclohexane, parts by weight—668
1,3-Butadiene, parts by weight—75
Styrene, parts by weight—25
Tetrahydrofuran, parts by weight—1.5
1,2-Butadiene, parts by weight—0.05–0.10
Multichelic initiator[a], mehm[b]—0.3–0.9
n-Butyllithium[c], mehm[b]—0–0.6
Polymerization temperature, °C.—120
Average residence time, minutes
    Scavenger reactor—7.5
    Stirred polymerization reactor—50
    Tube polymerization reactor—3.5
Pressure, MPa—0.76

(a) A 1,3-butadiene solubilized multilithium initiator prepared by tumbling a mixture of 420 ml of cyclohexane, 0.258 mole of 1,3-butadiene, 24 mmoles of mixed isomers of divinylbenzene and 75 mmoles of n-butyllithium at 70° C. for 40 minutes followed by dilution with cyclohexane to a concentration of 0.145 N as determined by hydrolysis and titration with standard acid. The cyclohexane in the multichelic initiator solution is included in the 668 parts of cyclohexane.
(b) mehm—Gram milliequivalent per 100 grams of total monomers.
(c) Scavenging agent added to scavenging reactor as a dilute solution (about 0.1 to 0.2 M) in cyclohexane. The cyclohexane used for dilution of the scavenging agent is included in the 668 parts of cyclohexane.

The polymerization reactor train employed for the preparation of this series of copolymers consisted of a 250 ml capacity stirred scavenging reactor having two inlet feedstream lines, one line carrying 1,3-butadiene, styrene, cyclohexane, 1,2-butadiene, and tetrahydrofuran to the scavenging reactor, and the second line carrying the n-butyllithium scavenging agent, when employed, in a dilute (about 0.1 to 0.2 M) solution in cyclohexane to the scavenging reactor. A line continuously carried effluent from the scavenging reactor to a 1700 ml capacity stirred polymerization reactor, the multichelic initiator in cyclohexane being added to the stirred polymerization reactor from a separate inlet. The effluent from the stirred polymerization reactor, which consisted of polymer cement at about 97.5 to 99.0% conversion of monomer to polymer, was taken to ≧99.5% conversion in a 65 ml capacity Kenics static tube mixer plus connecting tubing having a capacity of about 50 ml, prior to terminating the live polymer and isolating the polymer product. Polymer was prepared with and without the addition of n-butyllithium scavenging agent, and at different levels of 1,2-butadiene gel inhibitor.

The effect on Mooney viscosity of varying the amount of scavenging agent added to the scavenging reactor and the amount of multichelic initiator added to the polymerization reactor so as to maintain a constant total alkyl lithium was that the Mooney increased with an increase in scavenging agent up to the point where the amount of scavenging agent was in excess of that needed to inactivate the fast poisons. As the amount of scavenging agent was increased above that necessary to inactivate the poisons, the molecular weight of the polymer was decreased.

When scavenging was not employed, the addition of 1,2-butadiene gel inhibitor resulted in a reduction in the molecular weight of the polymer. Elimination of the fast poisons allowed for the production of higher molecular weight polymers with higher levels of the gel inhibitor. Thus with scavenging it was possible to obtain better inhibition of reactor fouling while still obtaining a more desirable product.

EXAMPLE II

75/25 Butadiene/styrene random copolymer was polymerized continuously using multichelic initiator in a reactor train consisting of two ⅜" diameter by 11" long Kenics static mixers as the scavenging reactor means, followed by a 5 gallon capacity stirred polymerization reactor. Fast poisons in the monomer, diluent, randomizer, and gel inhibitor were inactivated by adding to the feedstream in the scavenging reactors 0.02 phm n-butyllithium. This scavenging treatment allowed an increase in the 1,2-butadiene gel inhibitor level from 0.05 phm, which is typically used in this polymerization, to 0.08 phm while maintaining the desired 90–100 Mooney viscosity (ML-4 as described in ASTM D1646-74). This increase in gel inhibitor resulted in a 575-hour gel-free polymerization.

Although the polymerization reactor remained gel-free, after about 72 hours of operation, pluggage of the scavenging reactors (the two Kenics static mixers) became severe enough to require removal of one Kenics mixer scavenging reactor at a time from the reactor train for cleaning, while continuing to use the other in the continuous process. Cyclohexane was ineffective for removing the residual material causing the pluggage. Both acetone and tetrahydrofuran were effective, the latter being marginally better. Each of the static mixers was removed from the reactor train for cleaning every 36 to 48 hours thereafter throughout the 575 hour polymerization run. Cleaning was accomplished by pumping the selected solvent through the Kenics mixture at ambient temperature for a sufficient time to remove all deposits, the time varying with pumping speed and the amount of insoluble residue present. Although cleaning of the scavenging reactors had to be done in a vented hood due to the liberation of choking fumes, cleaning of the scavenger reactors could be accomplished in-line in a closed system in a commercial operation.

While particular embodiments of the present invention have been given for the purpose of illustrating the present invention, the specific examples should not be viewed as limiting the scope of the appended claims.

I claim:

1. In a continuous process for producing an olefin polymer wherein feed comprising at least one polymerizable olefin monomer and at least one polymerization initiator or catalyst are continuously brought into contact under polymerization conditions in a polymerization zone in the presence of olefin polymer, the improvement consisting essentially of contacting at least a portion of said feed which contains fast poisons with at least one suitable scavenging agent in a scavenging zone separate from the polymerization zone under conditions such that at least a portion of said fast poisons are inactivated without causing any significant amount of polymerization in said scavenging zone, and then contacting the product resulting from the scavenging zone with said initiator or catalyst in said polymerization zone under conditions sufficient to produce said olefin polymer.

2. A process according to claim 1 wherein said fast poisons are selected from the group consisting of carbon dioxide, oxygen, water, alkenes, acetylenes, carbonyl containing compounds, alcohols, and thiols.

3. A process according to claim 1 wherein each said scavenging agent is selected from materials which do not initiate polymerization of said monomers.

4. A process according to claim 3 wherein said each scavenging agent is selected from at least one compound of the group consisting of aluminum alkyls, zinc alkyls, and boron alkyls.

5. A process according to claim 4 wherein said scavenging agent is employed in an amount such that substantially all of the fast poisons are inactivated in said scavenging zone.

6. A process according to claim 5 wherein the amount of scavenging agent employed is selected in response to an analysis of the amount of catalyst poisons in the feed supplied to the scavenging zone.

7. A process according to claim 5 wherein the amount of scavenging agent added is no greater than about what is required to inactive substantially all of the fast poisons.

8. A process according to claim 7 wherein said fast poisons are selected from the group consisting of carbon dioxide, oxygen, water, alkenes, acetylenes, carbonyl containing compounds, alcohols, and thiols.

9. A process according to claim 1 wherein each said scavenging agent is selected from materials which can initiate polymerization of said at least one polymerizable olefin monomer.

10. A process according to claim 9 wherein each said scavenging agent is selected from the group consisting of alkali metals or organoalkali metal compounds of the formula $R(M)_x$ wherein R is a hydrocarbon radical having 1 to 20 carbon atoms selected from the group consisting of aliphatic, cycloaliphatic, and aromatic radicals, M is an alkali metal, and x is an integer from 1 to 4.

11. A process according to claim 9 wherein each said scavenging agent is an organolithium compound that is suitable for initiating the polymerization of said monomers.

12. A process according to claim 11 wherein the scavenging agent is identical to the initiator used in the polymerization.

13. A process according to claim 12 wherein said scavenging agent is employed in an amount such that substantially all of the fast poisons are inactivated in said scavenging zone.

14. A process according to claim 13 wherein the amount of scavenging agent added is selected in response to an analysis of the amount of catalyst poisons in the feed supplied to the scavenging zone.

15. A process according to claim 13 wherein the amount of scavenging agent added is selected in response to the properties of the polymer compared to the properties expected for a polymer produced in the absence of any fast poisons.

16. A process according to claim 13 wherein said at least one polymerizable olefin monomer comprises 1,3-butadiene.

17. A process according to claim 16 wherein a homopolymer of 1,3-butadiene is produced.

18. A process according to claim 16 wherein a copolymer of 1,3-butadiene and styrene is produced.

19. A process according to claim 18 wherein said copolymer is a random copolymer.

20. A process according to claim 12 wherein said feed to said scavenging zone comprises at least one polymerizable conjugated diene hydrocarbon.

21. A process according to claim 20 wherein said fast poisons are selected from the group consisting of carbon dioxide, oxygen, water, alkenes, acetylenes, carbonyl containing compounds, alcohols, and thiols.

22. A process according to claim 16 wherein said fast poisons are selected from the group consisting of carbon dioxide, oxygen, water, alkenes, acetylenes, carbonyl containing compounds, alcohols, and thiols.

23. A process according to claim 22 wherein said feed to said scavenging zone includes diluent for said polymerization.

24. A process according to claim 23 wherein said feed to said scavenging zone includes a gel inhibiting amount of a gel inhibitor.

25. A process according to claim 24 wherein said gel inhibitor is 1,2-butadiene.

26. A process according to claim 25 wherein the amount of scavenging agent employed is no greater than that needed to inactivate the fast poisons.

27. A process according to claim 1 wherein the amount of scavenging agent employed is no greater than that needed to inactivate the fast poisons.

28. A process according to claim 4 wherein substantially all of the feed that is to be passed to the polymerization zone that contains fast poisons is passed through said scavenging zone.

29. A process according to claim 28 wherein said scavenging agent is employed in an amount such that substantially all of the fast poisons are inactivated in said scavenging zone.

30. A process according to claim 29 wherein said polymerization is conducted with a Ziegler type polymerization catalyst.

31. A process according to claim 29 wherein said polymerization is conducted with polymerization initiator selected from the group consisting of alkali metals or organo alkali metal compounds of the formula $R(M)_x$ where R is a hydrocarbon radical having 1 to 20 carbon atoms selected from the group consisting of aliphatic, cycloaliphatic, and aromatic radicals, M is an alkali metal, and x is an integer of from 1 to 4.

32. A process according to claim 31 wherein said polymerization initiator is an organolithium compound.

33. A process according to claim 20 wherein said feed to said scavenging zone comprises at least one polymerizable monovinylarene hydrocarbon.

34. A process according to claim 11 wherein said polymerization is conducted with a polymerization initiator selected from organolithium metal compounds of the formula $R(Li)_x$ wherein R is a hydrocarbon radical having 1 to 20 carbon atoms selected from the group consisting of aliphatic, cycloaliphatic, and aromatic radicals, and x is an integer of from 1 to 4.

35. A process according to claim 34 wherein substantially all of the feed that is to be passed to the polymerization zone that contains fast poisons is passed through said scavenging zone.

36. A process according to claim 35 wherein said scavenging agent is employed in such an amount that substantially all of the fast poisons are inactivated in said scavenging zone.

37. A process according to claim 16 wherein substantially all of the feed that is to be passed to the polymerization zone that contains fast poisons is passed through said scavenging zone.

38. A process according to claim 37 wherein the amount of scavenging agent is no greater than that needed to inactivate the fast poisons.

* * * * *